(12) United States Patent
Hillan et al.

(10) Patent No.: US 8,391,904 B2
(45) Date of Patent: Mar. 5, 2013

(54) METHOD AND APPARATUS FOR MAINTAINING QUALITY OF SERVICE DURING REGULATORY DOMAIN CHANGE

(75) Inventors: John Hillan, Hampshire (GB);
 Alecsander P. Eitan, Hafia, IL (US);
 Vered Bar Bracha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 281 days.

(21) Appl. No.: 12/773,124

(22) Filed: May 4, 2010

(65) Prior Publication Data

US 2011/0111780 A1  May 12, 2011

Related U.S. Application Data

(60) Provisional application No. 61/176,917, filed on May 10, 2009.

(51) Int. Cl.
 *H04Q 7/20* (2006.01)
(52) U.S. Cl. ........... 455/509; 455/550.1; 455/552.1; 455/553.1; 455/67.11; 455/426.1; 370/310; 370/328; 370/329; 370/338; 370/343
(58) Field of Classification Search ........... 455/509, 455/550.1, 552.1, 553.1, 551, 575.1, 412.1, 455/412.2, 67.11, 434, 422.1, 403, 466, 445; 370/310.328, 329, 338, 343, 350
See application file for complete search history.

(56) References Cited

U.S. PATENT DOCUMENTS

| | | | |
|---|---|---|---|
| 2004/0151137 A1 | 8/2004 | McFarland et al. | |
| 2004/0203762 A1* | 10/2004 | Liu et al. | 455/434 |
| 2006/0120321 A1* | 6/2006 | Gerkis et al. | 370/329 |
| 2006/0242457 A1 | 10/2006 | Roy et al. | |
| 2008/0273577 A1* | 11/2008 | Ratner et al. | 375/133 |
| 2009/0111466 A1* | 4/2009 | Montemurro et al. | 455/434 |

OTHER PUBLICATIONS

International Search Report and Written Opinion—PCT/US2010/033934, International Search Authority—European Patent Office—Sep. 23, 2010.

* cited by examiner

*Primary Examiner* — Keith Ferguson
(74) *Attorney, Agent, or Firm* — Stanton Braden

(57) ABSTRACT

Mechanisms for optimizing the selection of a new legal channel during regulatory domain changes and improving the user experience during changes in the underlying physical link having wide applicability to many wireless communications links are disclosed. Applications comprise cellular networks, WLANs, WPANs. Wireless USB, high speed channels for Bluetooth and other uses of WiMedia as well as a wide range of radio technologies that use a number of time and/or frequency-domain separation techniques to create multiple channels in a given portion of the RF spectrum where there is no global agreement on the use of the RF spectrum. Differences could pertain to permitted frequency ranges, permitted power levels, requirements to detect and/or avoid other radio technologies, indoor/outdoor use requirements, and many others. The disclosed embodiments provide a method for taking advantage of, or at least minimizing the impact of, a change in the channel link which impacts the channel characteristics such as the available bandwidth.

24 Claims, 6 Drawing Sheets

METHOD AND APPARATUS FOR MAINTAINING QUALITY OF SERVICE DURING REGULATORY DOMAIN CHANGE

CLAIM OF PRIORITY UNDER 35 U.S.C. §119

The present application for patent claims priority to Provisional Application No. 61/176,917 entitled "APPARATUS AND METHOD FOR MANAGING CHANNEL CHANGE AND MAINTAINING QUALITY OF SERVICE IN AN ULTRA WIDE BAND SYSTEM" filed May 10, 2009, and assigned to the assignee hereof and hereby expressly incorporated by reference herein.

BACKGROUND

1. Field

The described aspects relate to wireless communications, and more particularly, to maintaining quality of wireless communication service links during regulatory boundary crossings.

2. Background

All wireless communication systems must establish a wireless channel link between devices. The channel has a number of characteristics such as bandwidth and latency that impact their suitability for certain types of data. These characteristics are impacted by factors including regulatory constraints. Some communication standards lack worldwide agreement on permitted channel characteristics: each international regulatory domain may specify local legal characteristics such as frequency ranges. Devices may require knowledge of their current location and regulatory domain before transmitting, to prevent broadcasting on frequencies, power levels, or other characteristics that are not legal in that location. However, in some cases requirements for regulatory device notification of legal transmission frequencies have not been adopted. Currently, there are some standards that lack a mechanism to alert a device that the channel it has been using is no longer legal upon a regulatory boundary crossing and/or regulatory domain change. The device will remain unaware that it must implement a channel change to meet new local regulatory requirements, which may also impact the bandwidth available to the device.

Even if the device, by some proprietary mechanism, becomes aware that a channel it is using is no longer legal because of a regulatory domain change, it may at present simply have to terminate the use of the channel. This could result in a negative user experience such as loss of video or audio playback without explanation. This disclosure describes techniques that offer a wide range of options that may improve this situation. For example, using techniques described below, the device may be able to select a different channel that is legal in the new regulatory domain.

Unfortunately, a change in channel characteristics, such as a reduction in available bandwidth, after a regulatory channel change may negatively impact the user experience and Quality of Service. For example, a user application may have a Quality of Service bandwidth requirement for supporting video streaming at 20 Mega bytes per second (Mbs). If the bandwidth of the new legal channel is less than the bandwidth of the previous channel, the ability to receive the video stream may be impaired. There is therefore a need in the art for optimizing the selection of a new channel during regulatory domain changes and improving the user experience during changes in the underlying physical link that impact the available bandwith by maintaining Quality of Service.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
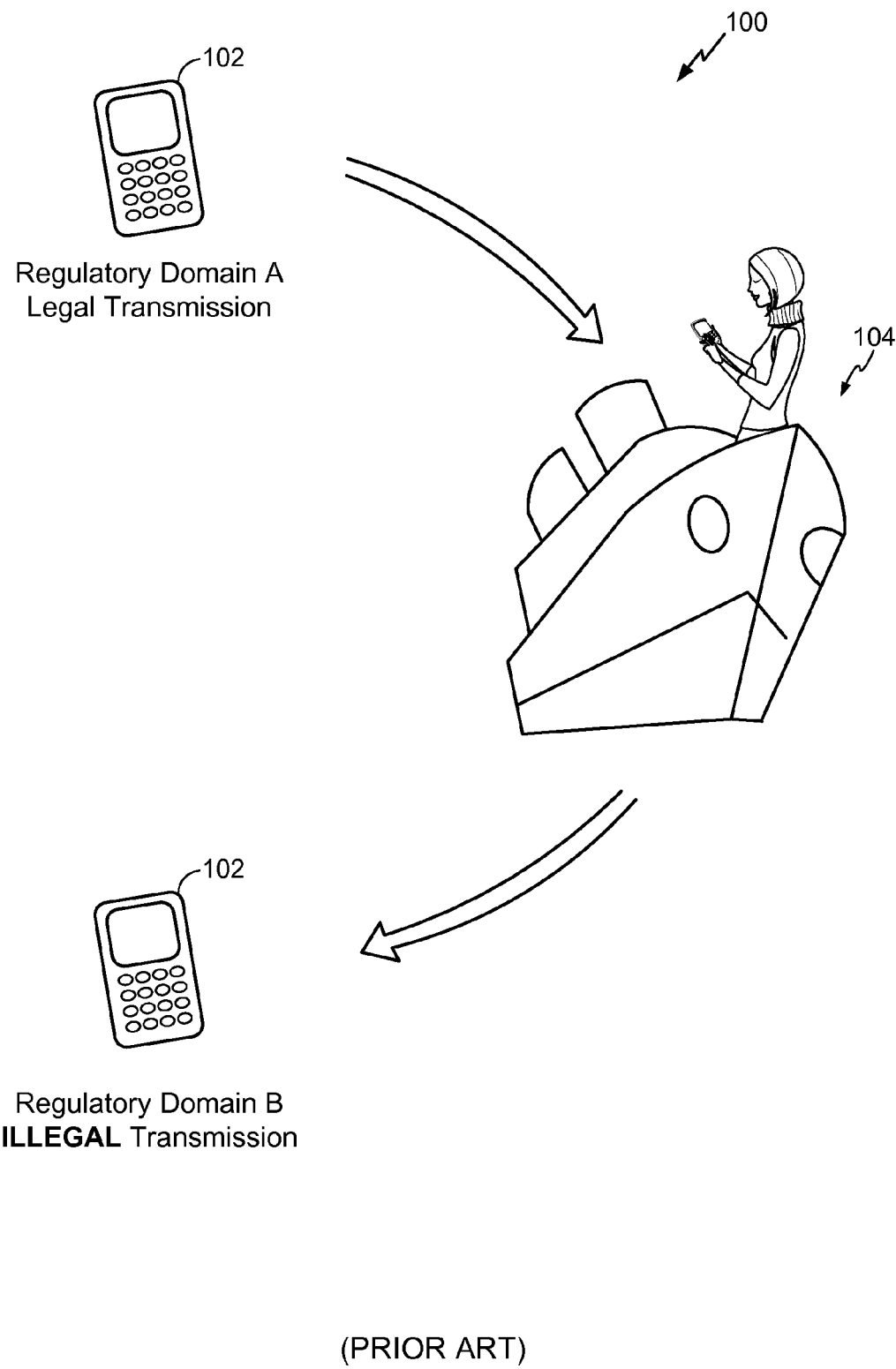
FIG. 1 shows an exemplary overview process diagram of traditional regulatory domain change transmission.

The word "exemplary" is used herein to mean "serving as an example, instance, or illustration." Any embodiment described herein as "exemplary" is not necessarily to be construed as preferred or advantageous over other embodiments.

The term "wireless device" as used herein refers to a wireless communication device such as a cellular telephone, wireless terminal, user equipment, laptop computer, High Data Rate (HDR) subscriber station, access terminal, or other personal communication system (PCS) device.

The term "transmission" is used herein to mean radiating a field from the present device, and does not necessarily imply that communication is in progress.

Mechanisms for optimizing the selection of a new legal channel during regulatory domain changes and improving the user experience during changes in the underlying physical link have wide applicability to many wireless communications links, including cellular networks, Wireless Local Area Networks (WLANs), and Wireless Personal Area Networks WPAN. Other exemplary applications comprise Wireless Universal Serial Bus (USB), alternate high speed channels for Bluetooth, other uses of WiMedia and a wide range of radio technologies that use a number of time- and/or frequency-domain separation techniques to create multiple channels in a given portion of the Radio Frequency (RF) spectrum. The present invention has applicability to any radio system in which there is no global agreement on the use of the RF spectrum. Differences could pertain to permitted frequency ranges, permitted power levels, requirements to detect and/or avoid other radio technologies, indoor/outdoor use requirements, and many others. The disclosed embodiments provide a method for taking advantage of, or at least minimizing the impact of, a change in the channel link which impacts the available bandwidth or other Quality of Service metrics.

When a device becomes aware that the physical channel needs to be changed, the disclosed embodiments cause the device to react in a number of ways that provide a better user experience and maintain Quality of Service (QoS) rather than simply ignoring the event. The device may check to see what new channel(s) is allowed by evaluating any local regulatory information to which it has access, and react accordingly. The device may also make predictions on whether the characteristics of the new legal channel allow it to maintain its QoS requirements, and take actions to address bandwidth shortfall if not. Conversely, the device can adjust its channel reservations to avoid unnecessary use of available bandwidth should it determine that new legal channels have more capacity than it needs.

In one aspect, the device may either poll to see if a channel change has occurred, or it may be notified if a channel change occurs. On discovering the need for a channel change, the device determines whether a potential channel is permitted by the local regulatory constraints. If not, the device immediately initiates an attempt to change the channel to one that is legal. A channel change count or other optimization algorithm prevents the channel being unsuccessfully changed back and forth repeatedly. If the attempt to change a prohibited channel to one that is legal is unsuccessful, the device must terminate its use of the communication link.

Assuming a new channel is legal, the device evaluates whether it can still meet its QoS needs. This comprises comparing the predicted characteristics of the new legal channel with that of the previous one. For example, if the amount of spectrum used is the same, the capacity may be similar, but if the new legal channel occupies a smaller amount of spectrum, the capacity may be lower. If the predicted bandwidth is too small for the QoS requirements, the device may either attempt to change to another channel with an acceptable capacity, attempt to increase its spectrum allocation within the current legal channel or downgrade performance. If the newly acquired channel is legal and the predicted bandwidth is greater than that of the previous channel, the device may renegotiate its spectrum allocation within the channel to lower the proportion of the medium used. This de-allocates unneeded spectrum for other channels to use, thus improving overall efficiency.

FIG. 1 illustrates traditional device transmissions during a regulatory domain change 100. A wireless device 102 occupying Regulatory Domain A transmits on a legal channel in domain A. A user of the wireless device 102 crosses a regulatory domain boundary into Regulatory Domain B 104. The wireless device 102 is either unaware of a change in regulatory constraints and continues to transmit in the same, possibly illegal, manner or the transmitting device becomes aware of a change in regulatory constraints and abruptly stops any illegal transmissions, causing the user to experience a link loss.

Figure 2:
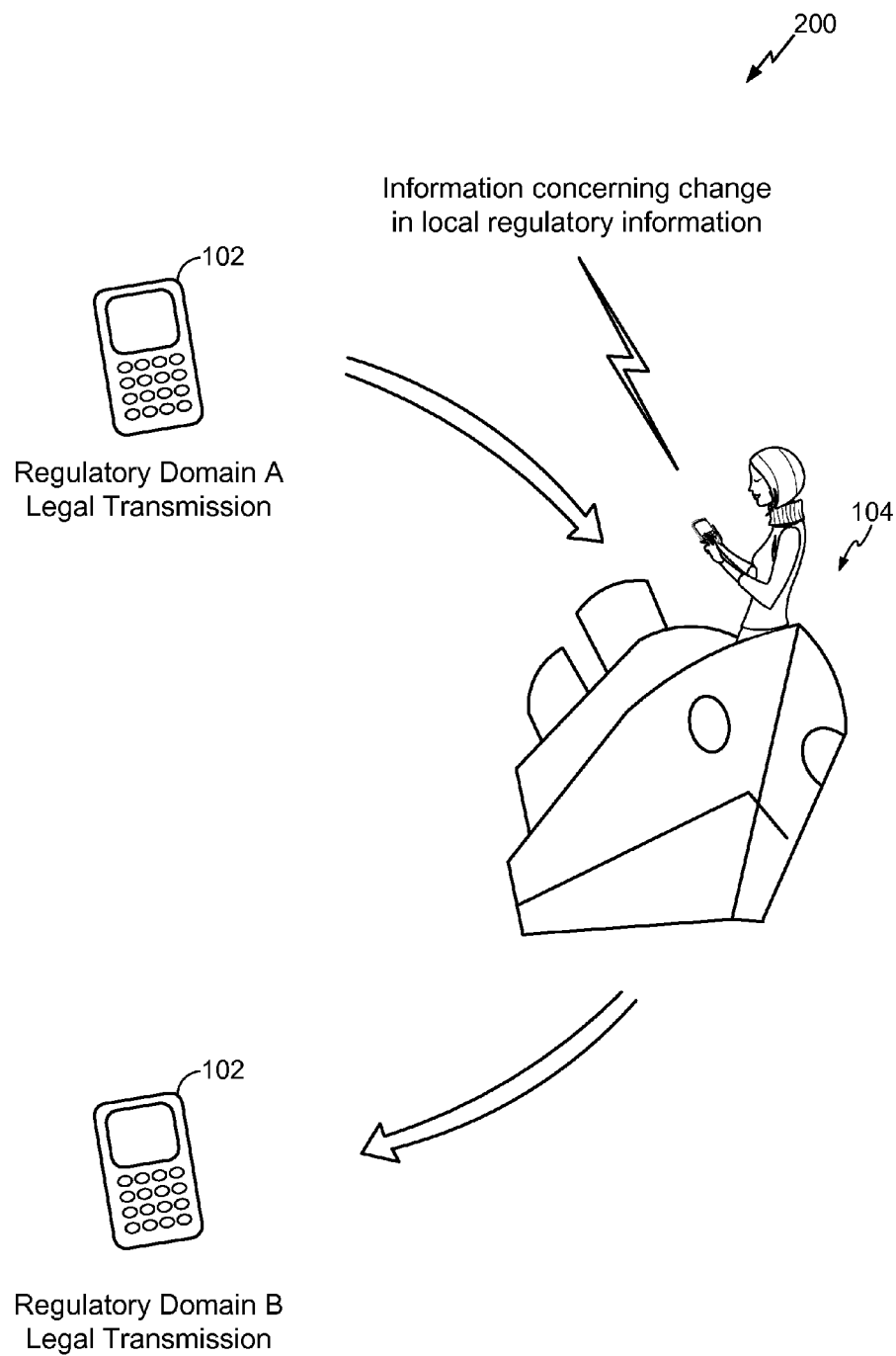
FIG. 2 shows an exemplary overview process diagram of regulatory domain change transmission maintaining Quality of Service.

FIG. 2 shows an exemplary overview process diagram of device transmissions during a regulatory domain change while maintaining Quality of Service 200. A wireless device 102 occupying Regulatory Domain A transmits on a legal channel in domain A. A user of the wireless device 102 crosses a regulatory domain boundary into Regulatory Domain B 104. Once a device 102 becomes aware of a change in local regulatory information, it attempts to modify the existing link in such a manner that it continues to meet the requirements imposed upon it while complying with the new regulatory conditions. The user may continue to use any links currently active and may be completely unaware of the change. If it is not possible to acquire a legal channel capable of maintaining the user's previous QoS, the user will at least be alerted by the device and appraised of the situation rather than experiencing an unexplained abrupt loss of all service. Examples of QoS requirements on the user's channel are the minimum guaranteed bandwidth of one or more communication links carried by the channel, and maximum acceptable latency for delivery of packets of data on those links. This is of particular importance when real-time data such as streaming audio or video is being carried by the channel. Below certain limits, the quality of the data becomes unacceptable to a user.

Maintaining QoS improves traditional regulatory domain change transmissions illustrated in FIG. 1 beyond a simple "obey the new law" scheme to one in which the user experience is improved or at least adverse impacts are minimized. This involves combining knowledge of permitted spectral usage characteristics with mechanisms for evaluating performance against requirements on the channel. Solutions may be found which are better than the previous conditions, or solutions may be identified that are just as good. If conditions do not permit either, adverse impact on the user is reduced, and a link is only terminated as a last resort. For example, the device 102 operates under the assumption that the user would prefer to switch to a lower resolution display than to lose the image completely.

Figure 3:
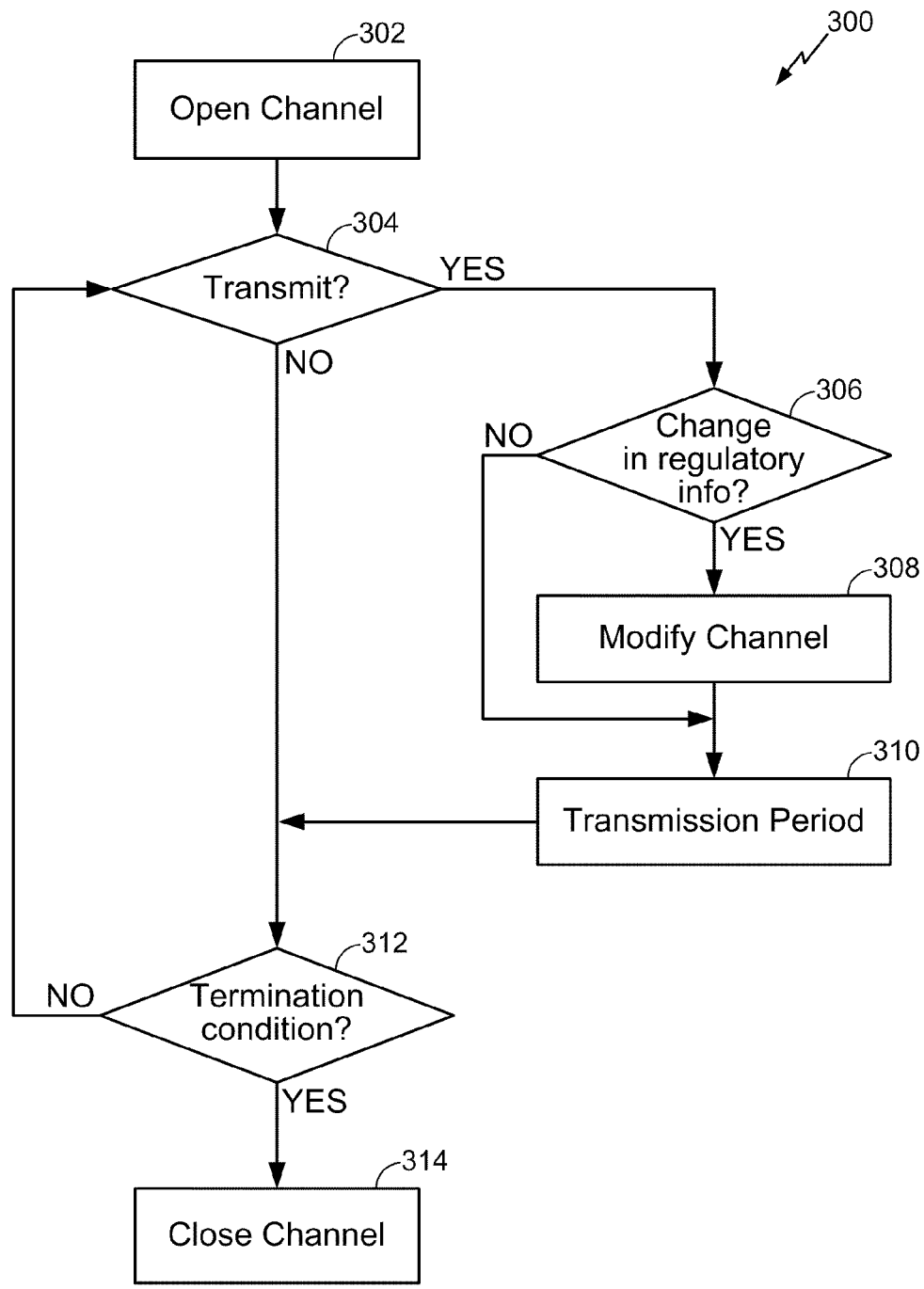
FIG. 3 is a flowchart illustrating an exemplary regulatory domain change transmission maintaining Quality of Service.

FIG. 3 is a flowchart illustrating operation of an exemplary device during regulatory domain change transmission while maintaining Quality of Service 300. When transmission is required, a novel check is performed to determine whether the regulatory information or constraints have changed. If regulatory constraints have changed, a new algorithm is called which may have one of three outcomes: the current channel continues to be used because it is still permitted, the channel is modified to meet the new regulatory constraints, or the channel is terminated because no suitable channel is permitted by the new regulatory constraints.

In step 302, a transmit channel is opened by a wireless device that is capable of supporting the user's QoS. Control flow proceeds to step 304.

In step 304, the wireless device determines whether transmission is required. If no transmission is required control flow proceeds to step 312, Otherwise, control flow proceeds to step 306.

In step 306, the wireless device determines whether there has been a change in regulatory constraints. If there has been no change in regulatory constraints, control flow proceeds to step 310. Otherwise control flow proceeds to step 308.

In step 308, the existing channel is modified to comply with the regulatory constraints determined in step 306. Channel modification algorithms are detailed in FIGS. 4 and 5. Control flow proceeds to step 310.

In step 310, the transmission occurs using the selected channel. Once the transmission is complete, control flow proceeds to step 312.

In step 312, the device determines whether a transmission termination condition has occurred. Typically termination may occur when there is no further communication required using the channel for a period of time. If no transmission termination conditions are present, control flow returns to step 304. Otherwise, control flow proceeds to step 314 where the existing channel is closed.

Figure 4:
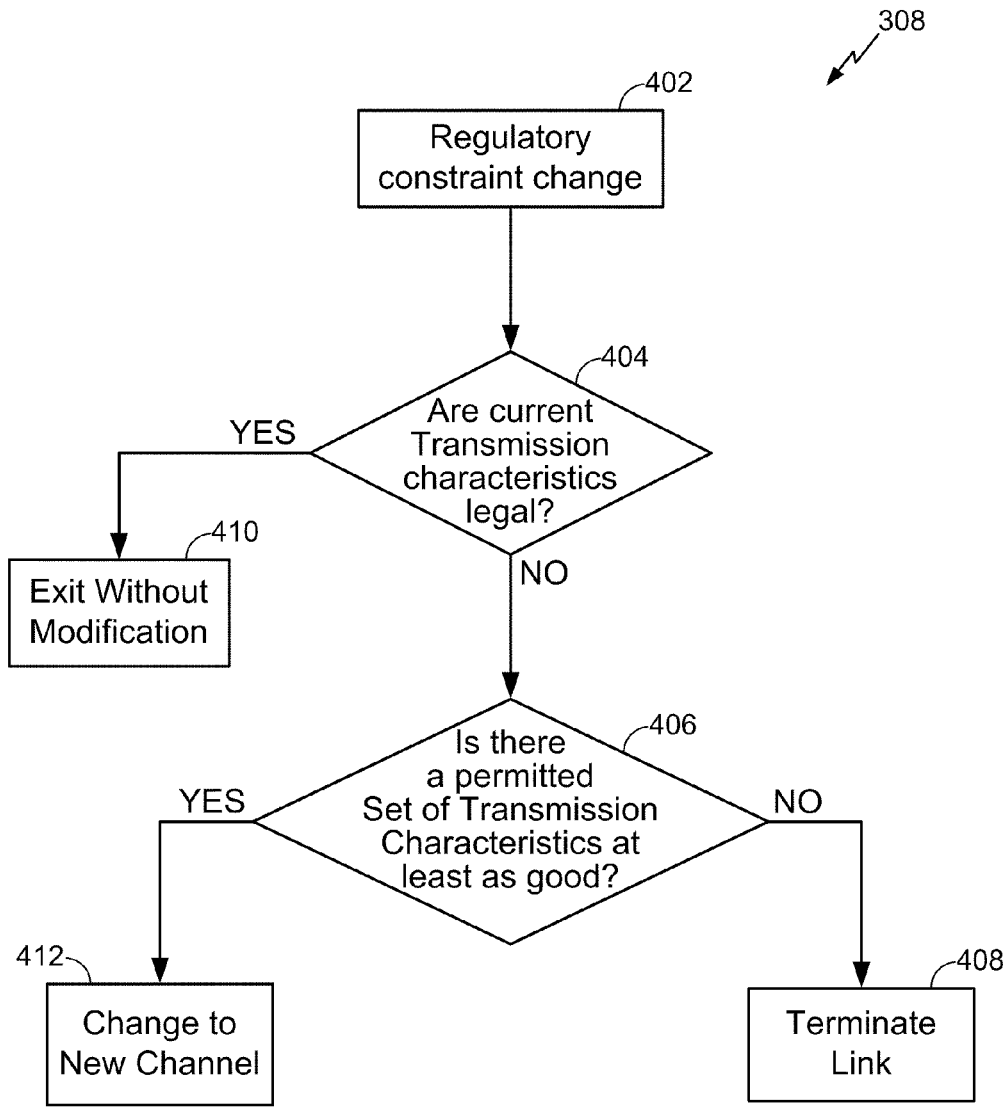
FIG. 4 is a flowchart illustrating an exemplary channel modification algorithm for maintaining Quality of Service during regulatory domain change.

FIG. 4 is a flowchart detailing an exemplary channel modification algorithm for maintaining Quality of Service during regulatory domain change 400. In this simple aspect, the channel modification algorithm leaves the existing channel alone as long as it remains legal. Otherwise, if it is possible to change to a permitted channel that still meets the QoS requirements for the link, the device changes to such a channel. If no acceptable is permitted, the link is terminated.

Control flow begins in step 402 when a regulatory constraint change has occurred. Control flow proceeds to step 404.

In step 404, the device determines whether the characteristics of the current transmission channel are legal under the new constraints determined in step 402. If the current channel characteristics are permitted under the new constraints, control flow ends in step 410 where no modification is made to the existing channel. Otherwise, control flow proceeds to step 406.

In step 406, the device determines whether there is a channel or channels available in the new regulatory domain having characteristics at least as good as its current channel. If so, control flow proceeds to step 412 where the device changes to the newly identified acceptable channel. Otherwise, control flow proceeds to step 408 where the current channel link is downgraded or terminated.

Figure 5:
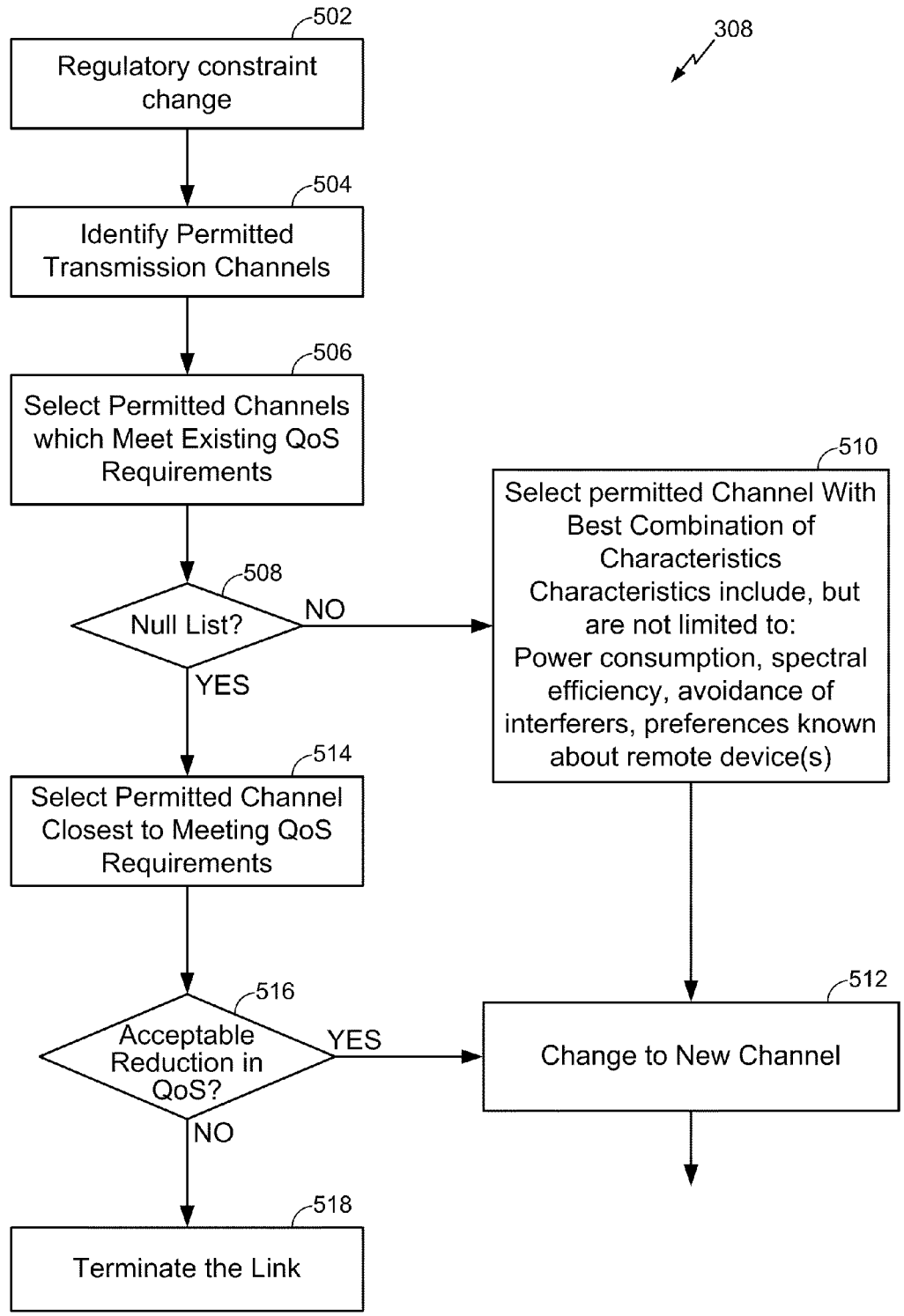
FIG. 5 is a flowchart illustrating another aspect of an exemplary channel modification algorithm for maintaining Quality of Service during regulatory domain change.

FIG. 5 is a flowchart detailing another aspect of an exemplary channel modification algorithm for maintaining Quality of Service during regulatory domain change 500. In this more complex aspect, a new regulatory domain might allow a channel that is higher quality than the existing one. A higher quality channel may comprise: lower power consumption in this devices, a longer range, a more robust link because of better error detection/correction, use of a smaller amount of the allowed spectrum thus potentially increasing the number of available channels, a channel which reduces the impact of known interferers or a channel which reduces its impact as an interferer on other links. The device may create a list of channels which are permitted by the new regulatory conditions and then select a subset of this list which meets the existing requirements on the channel, for example bandwidth and latency QoS requirements. If there are no channels which meet these requirements, the device may select the channel which comes closest to meeting the QoS requirements. Alternately the device may determine whether the available characteristics meet a threshold of acceptable degradation in performance and downgrade the performance of the device. The device may terminate the link if it cannot successfully downgrade performance, or change to the best identified channel. If more than one channel has acceptable characteristics, the device may select one that has the best combination of parameters for this device. Control flow begins in step 502 when a regulatory constraint change has occurred. Control flow proceeds to step 504.

In step 504, the device identifies permitted transmission channels in the new regulatory domain. Control flow proceeds to step 506.

In step 506, the device creates a list comprising a subset of the channels from the channels identified in step 504 that meet its existing QoS requirements. Control flow proceeds to step 508.

In step 508, the device determines if the list of channels meeting it QoS requirements is null. In other words, the device determines if any of the permitted channels can meet its QoS requirements. If the list is not null, control flow proceeds to step 510 where the device selects the permitted channel with the best combination of characteristics from the list comprising power consumption, spectral efficiency, and avoidance of interference characteristics. Control flow then proceeds to step 512 where the device changes to the channel selected in step 510.

If the list is null, control flow proceeds to step 514 where the device attempts to select a permitted channel identified in step 504 that most closely meets its QoS requirements and control flow proceeds to step 516.

In step 516, the device determines whether the reduction in the QoS of the channel selected in step 514 is acceptable. If the QoS of the best channel the device can acquire in the new domain is not acceptable, control flow proceeds to step 518 where the link is terminated, allowing the possibility of alerting the user. If the QoS is acceptable, control flow proceeds to step 512 where the device changes to the channel selected in step 514.

Figure 6:
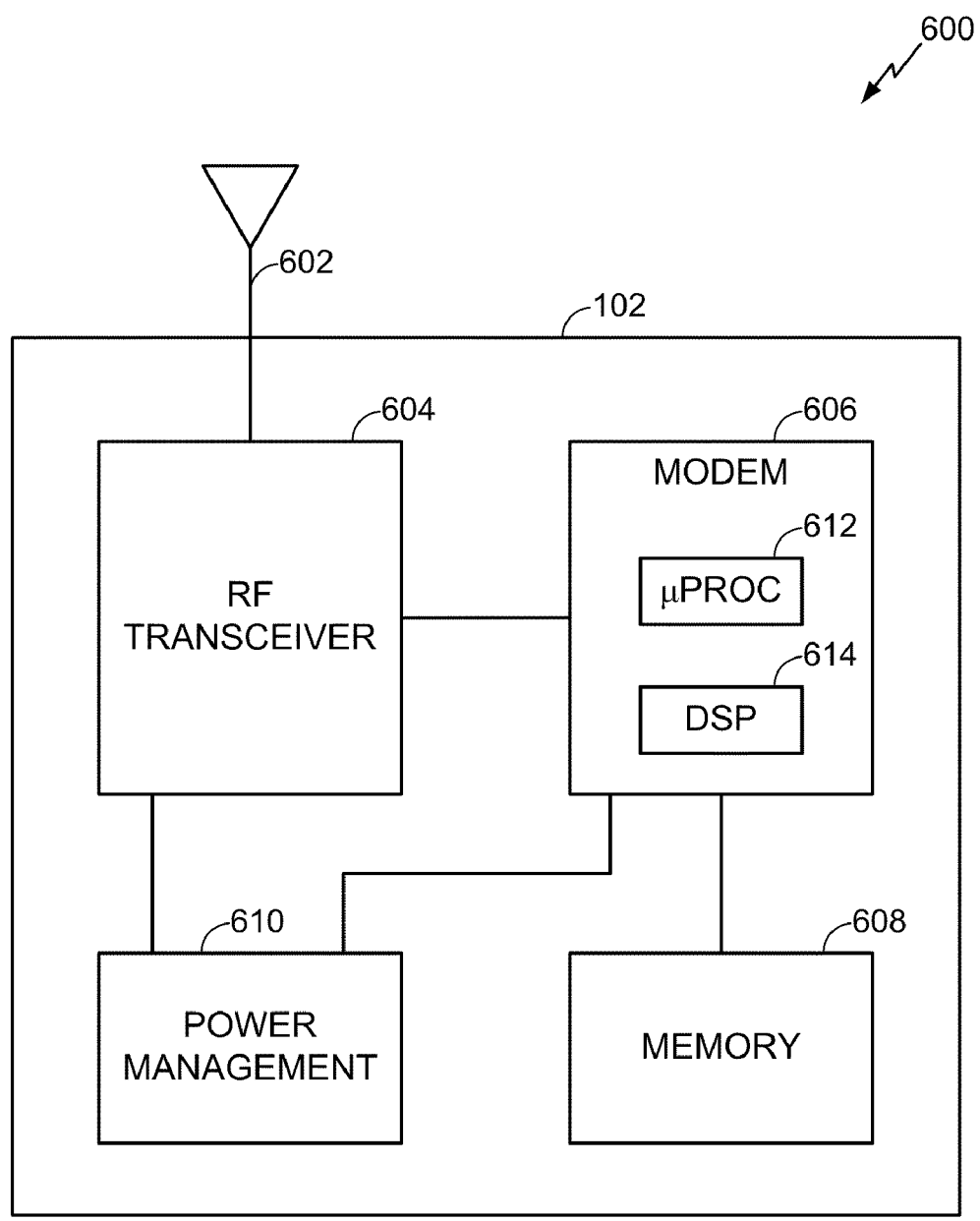
FIG. 6 is a block diagram illustrating an exemplary mobile device capable of maintaining Quality of Service during regulatory domain change.

FIG. 6 is a block diagram illustrating an exemplary mobile device capable of maintaining Quality of Service during regulatory domain changes 600. Wireless device 102 comprises a wireless communication transceiver 604 and associated antenna 602 capable of sending and receiving wireless communication signals. Modem 606 comprises the appropriate microprocessor(s) 612, digital signal processor(s) 614 and other suitable hardware, such as a correlator bank, for processing signals. Power management 610 controls power for various components of wireless device 104. Memory 608 is coupled to modem 604 as necessary for implementing various modem processes and functionality for maintaining Quality of Service during regulatory domain change. Wireless device 102 comprises an appropriate user interface with alphanumeric keypad, display, microphone, speaker, and other necessary components (not shown). It will be appreciated by those skilled in the art that Wireless device 102 may comprise a variety of components not shown.

The methodology for maintaining Quality of Service during regulatory domain change described herein may be implemented by suitable instructions operating on the microprocessor 612 and memory 608 of Wireless device 102, but is certainly not limited to such an implementation. The microprocessor 612 is connected to power management 610 and memory 608 having code or instructions directing the microprocessor 612 to maintain Quality of Service during regulatory domain change. Memory 608 may comprise instructions for maintaining Quality of Service during regulatory domain change. The memory 608 may include RAM memory, flash memory, ROM memory, EPROM memory, EEPROM memory, registers, a hard disk, a removable disk, a CD-ROM, or any other form of storage medium or computer readable media known in the art. In an exemplary aspect, the control processor 612 executes instructions stored in memory 608 according to the steps of FIGS. 1-5 to maintain Quality of Service during regulatory domain change.

The methodologies described in FIGS. 1-5 may be implemented by various means depending upon the application. For example, these methodologies may be implemented in hardware, firmware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

Firmware and/or software implementations of the methodologies described in FIGS. 1-5 may be implemented with modules (e.g., procedures, functions, and so on) that perform the functions described herein. For example, software codes may be stored in a memory, for example the memory 608 of the Wireless device 102, and executed by a processor, for example the processor 612 of the Wireless device 102. Memory may be implemented within the processor 612 or external to the processor 612. As used herein the term "memory" refers to any type of long term, short term, volatile, nonvolatile, or other memory and is not to be limited to any particular type of memory or number of memories, or type of media upon which memory is stored.

Any machine or computer readable medium tangibly embodying instructions may be used in implementing the methodologies described herein. In an exemplary aspect, the control processor 612 executes instructions stored in a computer readable medium according to the steps of FIGS. 1-5 for maintaining Quality of Service during regulatory domain change. Microprocessor 612 may execute instructions stored in a computer readable medium to provide previewing of multi-media file samples.

One skilled in the art will understand that ordering of steps illustrated in FIGS. 1-5 is not limiting. The method is readily amended by omission or re-ordering of the steps illustrated without departing from the scope of the disclosed aspects.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed:

1. A method for maintaining Quality of Service during a regulatory domain change comprising:
   determining, by a wireless device, that a change in regulatory constraints has occurred; and
   changing, by the wireless device, from transmission on an existing wireless channel, which was used for transmission until said determining, to transmission on another wireless channel that complies with the regulatory constraints.

2. The method of claim 1 wherein said changing comprises determining whether there is a channel or channels available in a new regulatory domain having characteristics at least as good as the existing channel.

3. The method of claim 1 wherein said changing comprises identifying permitted transmission channels in a new regulatory domain and creating a list comprising a subset of the identified permitted channels that meet existing Quality of Service requirements of the wireless device.

4. The method of claim 1 wherein said changing comprises selecting a permitted transmission channel in a new regulatory domain that most closely meets existing Quality of Service requirements of the wireless device.

5. The method of claim 4 wherein the channel that most closely meets existing Quality of Service requirements of the wireless device is determined to have an acceptable reduction in Quality of Service.

6. The method of claim 1 wherein said changing comprises selecting a permitted transmission channel in a new regulatory domain having the best combination of channel characteristics for the wireless device.

7. A wireless device for maintaining Quality of Service during a regulatory domain change comprising:
   a wireless communications transceiver and associated antenna capable of transmitting and receiving wireless communications signals;
   a modem coupled to the transceiver comprising a processor for determining that a change in regulatory constraints has occurred and for changing from transmission on an existing wireless channel, which was used for transmission until said determining, to transmission on another wireless channel that complies with the regulatory constraints; and
   memory coupled to the modem for storing instructions for said determining changing.

8. The wireless device of claim 7 wherein the processor determines whether there is a channel or channels available in a new regulatory domain having characteristics at least as good as the existing channel.

9. The wireless device of claim 8 wherein the channel that most closely meets existing Quality of Service requirements of the wireless device is determined, by the processor, to have an acceptable reduction in Quality of Service.

10. The wireless device of claim 7 wherein the processor identifies permitted transmission channels in a new regulatory domain and creates a list comprising a subset of the identified permitted channels that meet existing Quality of Service requirements of the wireless device.

11. The wireless device of claim 7 wherein the processor selects a permitted transmission channel in a new regulatory domain that most closely meets existing Quality of Service requirements of the wireless device.

12. The wireless device of claim 7 wherein the processor selects a permitted transmission channel in a new regulatory domain having the best combination of channel characteristics for the wireless device.

13. A wireless device for maintaining Quality of Service during a regulatory domain change comprising:
   means for transmitting and receiving wireless communications signals;
   means for determining that a change in regulatory constraints has occurred and changing from transmission on an existing wireless channel, which was used for transmission until said determining, to transmission on another wireless channel that complies with the regulatory constraints; and
   means for storing instructions for said determining and changing.

14. The wireless device of claim 13 wherein the means for determining and changing determines whether there is a channel or channels available in a new regulatory domain having characteristics at least as good as the existing channel.

15. The wireless device of claim 13 wherein the means for determining and changing identifies permitted transmission channels in a new regulatory domain and creates a list comprising a subset of the identified permitted channels that meet existing Quality of Service requirements of the wireless device.

16. The wireless device of claim 13 wherein the means for determining and changing selects a permitted transmission channel in a new regulatory domain that most closely meets existing Quality of Service requirements of the wireless device.

17. The wireless device of claim 16 wherein the channel that most closely meets existing Quality of Service requirements of the wireless device is determined, by the means for determining and changing, to have an acceptable reduction in Quality of Service.

18. The wireless device of claim 13 wherein the means for determining and changing selects a permitted transmission channel in a new regulatory domain having the best combination of channel characteristics for the wireless device.

19. A computer program product, comprising:
   computer-readable medium comprising:
      code for causing a computer to determine that a change in regulatory constraints has occurred; and
      code for causing a computer to change from transmission on an existing wireless channel, which was used for transmission until said determining, to transmission on another wireless channel that complies with the regulatory constraints.

20. The computer product of claim 19 wherein the code for causing a computer to change causes determining whether there is a channel or channels available in a new regulatory domain having characteristics at least as good as the existing channel.

21. The computer product of claim 19 wherein the code for causing a computer to change causes identifying permitted transmission channels in a new regulatory domain and creating a list comprising a subset of the identified permitted channels that meet existing Quality of Service requirements of the wireless device.

22. The computer product of claim 19 wherein the code for causing a computer to change causes selecting a permitted transmission channel in a new regulatory domain that most closely meets existing Quality of Service requirements of the wireless device.

23. The computer product of claim 22 wherein the channel that most closely meets existing Quality of Service requirements of the wireless device is determined to have an acceptable reduction in Quality of Service.

24. The computer product of claim 19 wherein the code for causing a computer to change causes selecting a permitted transmission channel in a new regulatory domain having the best combination of channel characteristics for the wireless device.

\* \* \* \* \*